US011733671B2

(12) United States Patent
Kanke et al.

(10) Patent No.: US 11,733,671 B2
(45) Date of Patent: Aug. 22, 2023

(54) TESTING SYSTEM HAVING A CONTROL DEVICE

(71) Applicant: MEIDENSHA CORPORATION, Tokyo (JP)

(72) Inventors: Masayasu Kanke, Tokyo (JP); Takao Akiyama, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 436 days.

(21) Appl. No.: 16/971,862

(22) PCT Filed: Dec. 19, 2018

(86) PCT No.: PCT/JP2018/046843
§ 371 (c)(1),
(2) Date: Aug. 21, 2020

(87) PCT Pub. No.: WO2019/163277
PCT Pub. Date: Aug. 29, 2019

(65) Prior Publication Data
US 2021/0011454 A1  Jan. 14, 2021

(30) Foreign Application Priority Data

Feb. 23, 2018 (JP) .................................. 2018-030884

(51) Int. Cl.
*G05B 19/404* (2006.01)
*G01L 3/04* (2006.01)
(Continued)

(52) U.S. Cl.
CPC .............. *G05B 19/404* (2013.01); *G01L 3/04* (2013.01); *G01M 99/00* (2013.01); *G01P 3/00* (2013.01);
(Continued)

(58) Field of Classification Search
None
See application file for complete search history.

(56) References Cited

U.S. PATENT DOCUMENTS 5,078,008 A * 1/1992 Yagi .................... G01M 15/044
73/116.05
5,656,768 A * 8/1997 Abler .................... G01M 15/00
73/460
(Continued)

FOREIGN PATENT DOCUMENTS

JP   H05-215643 A   8/1993
JP   2003121287 A   4/2003
(Continued)

OTHER PUBLICATIONS

International Search Report (with English translation) and Written Opinion dated Mar. 12, 2019 issued in corresponding Application No. PCT/JP2018/046843.
(Continued)

*Primary Examiner* — Jason Lin
(74) *Attorney, Agent, or Firm* — Muncy, Geissler, Olds & Lowe, P.C.

(57) ABSTRACT

This overall control device for a testing system comprises: a plurality of resonance suppression controllers that each generate a torque current command signal for suppressing mechanical resonance between a specimen and a dynamometer upon receiving a base torque current command signal and axial torque detection signal and have different input/output characteristics; a specimen characteristic acquisition unit for acquiring the value of the moment of inertia of the specimen connected to the dynamometer; and a resonance-suppression-controller selection unit for selecting one of the plurality of resonance suppression controllers on the basis of the value of the moment of inertia acquired by the specimen
(Continued)

characteristic acquisition unit and mounting the selected resonance suppression controller in a dynamometer control module.

6 Claims, 12 Drawing Sheets

(51) Int. Cl.
    *G01M 99/00*     (2011.01)
    *G01P 3/00*     (2006.01)
    *G05B 19/406*     (2006.01)

(52) U.S. Cl.
    CPC .. *G05B 19/406* (2013.01); *G05B 2219/39188* (2013.01)

(56) References Cited

U.S. PATENT DOCUMENTS

| | | | |
|---|---|---|---|
| 6,775,610 B2* | 8/2004 | Akiyama | G01M 15/044 73/114.25 |
| 8,695,408 B2* | 4/2014 | Fuchino | G01M 15/044 73/114.15 |
| 8,970,145 B2* | 3/2015 | Ishii | H02P 23/0004 318/632 |
| 9,164,005 B2* | 10/2015 | Takahashi | G01L 5/0042 |
| 9,616,965 B2* | 4/2017 | Morelli | B62M 3/086 |
| 9,739,687 B2* | 8/2017 | Akiyama | G01M 15/02 |
| 10,041,858 B2* | 8/2018 | Akiyama | G01M 15/02 |
| 2010/0251811 A1* | 10/2010 | Akiyama | G01M 15/02 73/116.05 |
| 2013/0325185 A1* | 12/2013 | Ye | B60W 10/08 700/275 |
| 2014/0136124 A1* | 5/2014 | Maroonian | F16D 48/064 702/41 |
| 2015/0039246 A1* | 2/2015 | Takahashi | G01L 5/24 702/41 |
| 2016/0084735 A1* | 3/2016 | Akiyama | G01M 15/044 73/116.05 |
| 2016/0134218 A1* | 5/2016 | Yamaguchi | B60L 15/025 318/139 |
| 2018/0003589 A1 | 1/2018 | Akiyama et al. | |
| 2018/0031448 A1 | 2/2018 | Sugita et al. | |
| 2019/0017894 A1* | 1/2019 | Akiyama | G01M 15/046 |

FOREIGN PATENT DOCUMENTS

| | | |
|---|---|---|
| JP | 3757839 B2 | 3/2006 |
| JP | 4023195 B2 | 12/2007 |
| JP | 4320029 B2 | 8/2009 |
| JP | 5136247 B2 | 2/2013 |
| JP | 2014-142317 A | 8/2014 |
| JP | 5839154 B1 | 1/2016 |
| JP | 6044647 B2 | 12/2016 |
| JP | 2018017591 A | 2/2018 |

OTHER PUBLICATIONS

Notice of Reasons for Rejection issued to JP Application No. 2018-030884, dated Mar. 12, 2019.
Decision of Rejection issued to JP Application No. 2018-030884, dated Jun. 25, 2019.
Decision to Grant a Patent issued to JP Application No. 2018-030884, dated Dec. 10, 2019.

* cited by examiner

FIG. 6

| a0~a1 | RESONANCE SUPPRESSION CONTROLLER 32_1 |
|---|---|
| a1~a2 | RESONANCE SUPPRESSION CONTROLLER 32_2 |
| ... | ... |
| an-1~an | RESONANCE SUPPRESSION CONTROLLER 32_n |

TESTING SYSTEM HAVING A CONTROL DEVICE

TECHNICAL FIELD

The present invention relates to a control device of a testing system.

BACKGROUND ART

In a testing system such as an engine bench system or drive train bench system, since an inertial body such as the engine or drive train which is the specimen is coupled to an electric motor via a coupling shaft which is a spring element, considerable resonance occurs. In addition, with such a testing system, since there are many cases of using a high rigidity and low damping member as the coupling shaft in order to obtain high responsiveness, the resonance becomes remarkable. Therefore, based on a detection signal of shaft torque acting on the coupling shaft and a higher-order command signal, a resonance suppression controller for generating a torque electrical current command signal such that suppresses resonance is built into the testing system (for example, refer to Patent Document 1).

Patent Document 1: Japanese Patent No. 5839154

DISCLOSURE OF THE INVENTION

Problems to be Solved by the Invention

However, as the resonance suppression controller built into the testing system, a unit designed separately according to the characteristics of the specimen by a specialized designer is used so that a sufficient resonance suppression effect is obtained. For this reason, conventionally, it has been necessary for the designer to go out every time the specimen is exchanged to newly redesign the resonance suppression controller, and there is concern over taking a long time until starting testing on a new specimen.

The present invention has an object of providing a control device of a testing system which can, even in a case of a specimen being exchanged with a new piece, start testing rapidly under a resonance suppression controller according to the characteristics of this new specimen.

Means for Solving the Problems

A control device (for example, the overall control device 1, 1a described later) according to a first aspect of the present invention is a control device for a testing system (for example, the testing system SS, SSa described later) including: an electric motor (for example, the dynamometer D, Da described later) connected to a specimen (for example, the specimen W, Wa described later) via a connecting shaft (for example, the connecting shaft S, input shaft S1 described later); an inverter (for example, the inverter 7 described later) that supplies electric power to the electric motor according to a torque current command signal; a shaft torque sensor (for example, the shaft torque sensor 81 described later) that generates a shaft torque detection signal according to shaft torque generated in the connecting shaft; and a rotational speed sensor (for example, the rotational speed sensor 82 described later) that generates a rotational speed detection signal according to the rotational speed of the electric motor. The control device includes: a plurality of resonance suppression controllers (for example, the resonance suppression controllers 32_1, . . . , 32_n, resonance suppression controllers 32a_1, . . . , 32a_m described later) which generate the torque electrical-current command signal such that mechanical resonance between the specimen and the electric motor is suppressed, and having respectively different input-output characteristics, when the higher-order command signal for the torque current command signal, and the shaft torque detection signal are inputted; a specimen characteristic acquisition means (for example, the specimen characteristic acquisition unit 51, 51a described later) for acquiring a value of a characteristic parameter of a specimen connected to the electric motor; and a resonance suppression controller selection means (for example, the resonance suppression controller selection unit 52, 52a described later) for selecting one among the plurality of resonance suppression controllers based on the value of the characteristic parameter acquired by the specimen characteristic acquisition means, in which the control device inputs the higher-order command signal and the shaft torque detection signal to a resonance suppression controller (for example, the resonance suppression controller 32_i, 32a_j described later) selected by the resonance suppression controller selection means, and inputs to the inverter the torque current command signal generated by the resonance suppression controller selected.

According to a second aspect of the present invention, in this case, it is preferable for the characteristic parameter to be the moment of inertia of the specimen connected to the electric motor.

According to a third aspect of the present invention, in this case, it is preferable for the specimen characteristic acquisition means to include: a data acquisition means (for example, means related to execution of system identification operation of Step S2 in FIG. 2 or Step S12 in FIG. 10 described later) for executing excitation operation of the electric motor over a predetermined time according to a command manipulation from an operator, and acquiring data including the shaft torque detection signal and the rotational speed detection signal during execution of the excitation operation; and a characteristic parameter calculation means (for example, means related to execution of system identification processing of Step S3 in FIG. 2 or Step S13 in FIG. 10) for calculating a value of the characteristic parameter based on data acquired by the data acquisition means.

Effects of the Invention

The control device of a testing system according to the first aspect of the present invention includes a plurality of resonance suppression controllers which generates a torque electrical-current command signal such that the mechanical resonance between the specimen and electric motor is suppressed and having the respectively different I/O characteristics, when the high-order command signal for the torque electrical-current command signal and the shaft torque detection signal are inputted. In addition, the present invention acquires the value of the characteristic parameter of the specimen connected to the electric motor by way of the specimen characteristic acquisition means, and selects one among the plurality of resonance suppression controller based on the value of the characteristic parameter acquired by the resonance suppression controller selection means. Furthermore, the present invention inputs the higher-order command signal and shaft torque detection signal to the resonance suppression controller selected according to the value of the characteristic parameter, and inputs the torque electrical-current command signal generated by this resonance suppression controller to the inverter. Therefore, according to the present invention, even in a case of the specimen connected to the electric motor being exchanged with a new one, since the resonance suppression controller according to the characteristic of this specimen is automatically selected, it is possible to quickly start testing without requiring to newly reset a resonance suppression controller according to the specimen. In addition, the present invention can obtain a stable resonance suppression effect irrespective of the skill of the operator, by automatically selecting a controller according to the value of the characteristic parameter of the specimen from among a plurality of controllers prepared in advance, as the resonance suppression controller.

According to the second aspect of the present invention, generally, upon designing a resonance suppression controller, in addition to the moment of inertia of the specimen connected to the electric motor, the value of characteristic parameters such as the spring constant and attenuation constant are also necessary; however, the value of the moment of inertia of the specimen among these characteristic parameters has a great influence on the resonance suppression effect by the resonance suppression controller. Therefore, the present invention focuses on the moment of inertia among this plurality of characteristic parameters, and selects the resonance suppression controller according to the value of the moment of inertia. It is thereby possible to obtain a high resonance suppression effect, while minimizing the number of resonance suppression controllers prepared in advance.

According to the third aspect of the present invention, the specimen characteristic acquisition means executes excitation operation of the electric motor in response to a command manipulation from the operator, as well as acquiring data including the shaft torque detection signal and rotational speed detection signal during execution of this excitation operation, and further calculating the value of the characteristic parameter based on the acquired data. In other words, the present invention can perform from acquisition of the characteristic parameter of the specimen until selection of a resonance suppression controller according to the value of this characteristic parameter entirely automatically. Consequently, according to the present invention, since the labor for the operator to perform testing for identifying the value of the characteristic parameter of the specimen, and the labor for inputting the acquired value of the characteristic parameter are saved, the convenience is high.

BRIEF DESCRIPTION OF THE DRAWINGS

FIG. 6 is a view showing a specific example of a table stored in a resonance suppression controller selection unit;

PREFERRED MODE FOR CARRYING OUT THE INVENTION

First Embodiment

Figure 1:
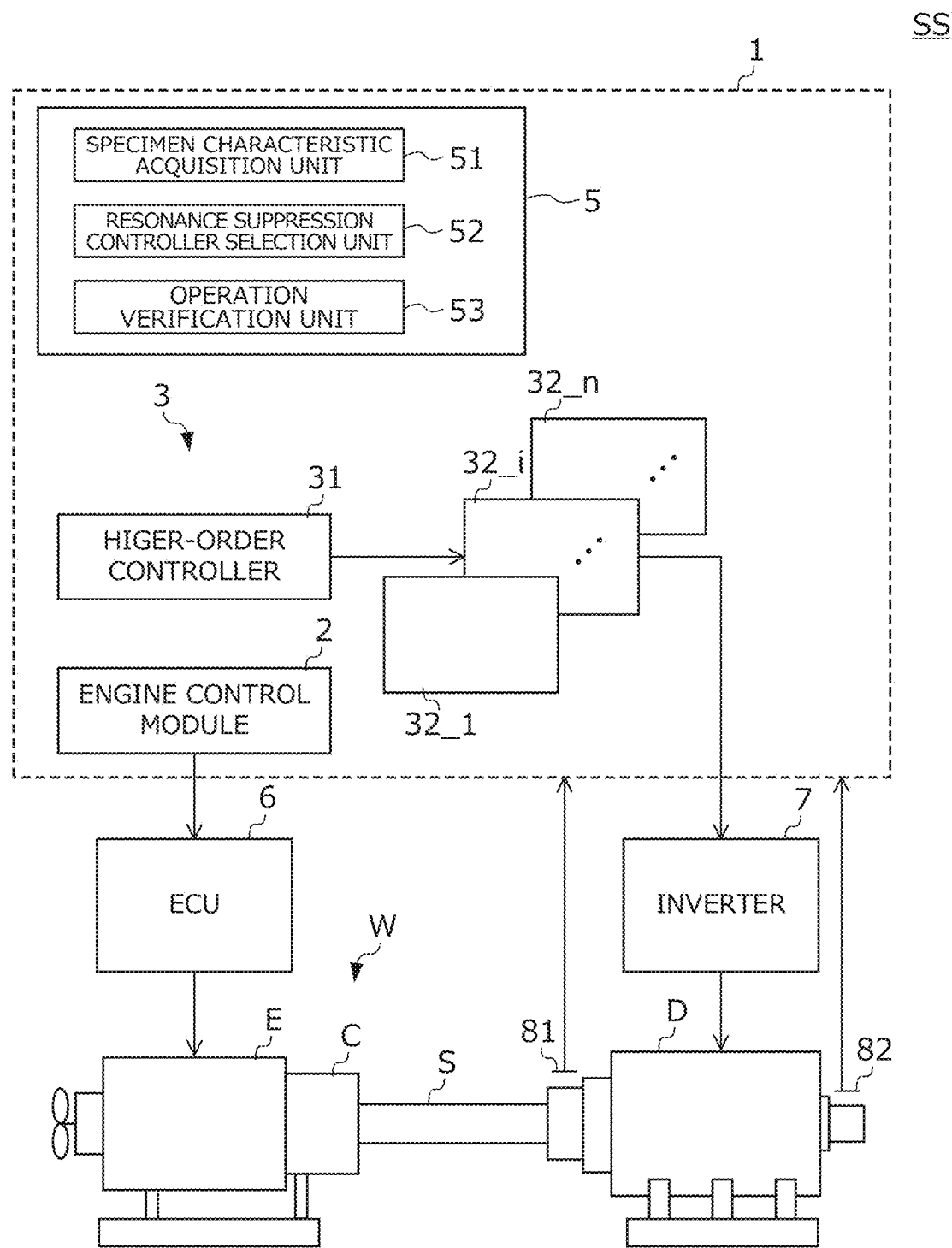
FIG. 1 is a view showing the configuration of a testing system and an overall control device according to a first embodiment of the present invention.

Hereinafter, a first embodiment of the present invention will be explained in detail while referencing the drawings. FIG. 1 is a view showing the configurations of a testing system SS and an overall control device 1 according to the present embodiment. It should be noted that the present embodiment explains a case of applying the present invention to a testing system, a so-called engine bench system, related to engines establishing an engine equipped to a vehicle as the specimen as shown in FIG. 1.

The testing system SS includes: a specimen W configured by combining an engine E and clutch C of a vehicle; a dynamometer D coupled with this specimen W via a substantially rod-shaped connecting shaft S (for example, propeller shaft); an overall control device 1 which is a computer system that controls this specimen W and dynamometer D; an engine electronic control unit (hereinafter abbreviation of "ECU (Electronic Control Unit) 6" is used) which controls the throttle aperture of the engine E according to the command signal sent from the overall control device 1, and thus the output thereof; an inverter 7 which supplies electric power to the dynamometer D according to a command signal from the overall control device 1 and controls the output thereof; a shaft torque sensor 81 which detects torsional torque (hereinafter referred to as "shaft torque") occurring in the connecting shaft S; and a rotational speed sensor 82 which detects the rotational speed of the output shaft of the dynamometer D.

The shaft torque sensor 81 has one end side coupled by a coupling (not shown) with a connecting shaft S, and the other end side coupled by a coupling (not shown) with the output shaft of the dynamometer D. The shaft torque sensor 81 generates a shaft torque detection signal according to the shaft torque generating in the connecting shaft S, and sends this to the overall control device 1.

The engine E, clutch C, connecting shaft S and dynamometer D are mechanically connected so as to be coaxial by this shaft torque sensor 81. It should be noted that, in the mechanical system configured by connecting this engine E, clutch C, connecting shaft S, shaft torque sensor 81 and dynamometer D, the main inertial elements are the engine E and dynamometer D, and the main spring element is the clutch C. In addition, this mechanical system includes a spring element, and thus mechanical resonance can occur. It should be noted that the present embodiment explains a case of connecting the specimen W including the clutch C which is the main spring element, and the dynamometer D by the connecting shaft S; however, the present invention is not limited thereto. As the specimen, one not including a clutch may be used, or an axial body having a spring constant made considering the resonance point by the clutch may be used as a connecting shaft in place thereof.

The rotational speed sensor 82 is a rotary encoder, for example. The rotational speed sensor 82, when the output shaft of the dynamometer D rotates, generates a rotational speed detection signal that is a pulse signal according to the rotational speed thereof, and sends this to the overall control device 1.

The ECU 6, when the accelerator stroke command signal generated in accordance with the control program executed in the engine control module 2 of the overall control device 1 is inputted, controls the throttle aperture of the engine E so that the accelerator stroke amount designated by this accelerator stroke command signal is realized.

The inverter 7, when the torque current command signal generated in accordance with the control program executed by the dynamometer control module 3 of the overall control device 1 is inputted, supplies electric power to the dynamometer D so that this torque electrical current command signal is realized.

The overall control device 1 which is a computer is configured by an engine control module 2 that generates the accelerator stroke command signal according to the test content of the specimen W; the dynamometer control module 3 that generates the torque electrical current command signal based on the shaft torque detection signal sent from the shaft torque sensor 81 and the rotational speed detection signal sent from the rotational speed sensor 82; and the design module 5 that acquires the mechanical characteristic of the specimen W connected to the dynamometer D, and constructs the dynamometer control module 3 suited to the mechanical characteristic of this specimen W.

The dynamometer control module 3 includes: a higher-order controller 31, and n-number (n is an integer of 2 or more) of resonance suppression controllers 32_1, 32_2, . . . , 32_n having different I/O characteristics, respectively.

The higher-order controller 31 generates a base torque electrical current command signal, which is a higher-order command signal for the torque electrical current command signal in accordance with a predetermined algorithm. More specifically, the higher-order controller 31 generates the base torque current command signal in accordance with a known control algorithm, such as shaft torque control using the shaft torque detection signal, or rotational speed control using the rotational speed detection signal.

The resonance suppression controllers 32_1, . . . , 32_n, when the base torque current command signal, shaft torque detection signal and rotational speed detection signal are inputted, each have a resonance suppression function of generating the torque electrical current command signal so that the mechanical resonance which can occur between the specimen W and dynamometer D in the above-mentioned mechanical system is suppressed. In addition, this n-number of resonance suppression controllers 32_1, . . . , 32_n respectively have different I/O characteristics from the base torque current command signal, shaft torque detection signal and rotational speed detection signal until the current command signal.

However, the specimen W which is the main inertial element in the above-mentioned mechanical system can be exchanged as appropriate by the operator, every time changing the vehicle type established as the testing target, for example. In addition, the mechanical characteristic of the specimen W vary according to the vehicle type and are basically unknown. For this reason, when changing the specimen W that is part of the mechanical system, the characteristic of the mechanical resonance that can occur in this mechanical system also changes.

Therefore, in the dynamometer control module 3, the resonance suppression controllers 32_1, . . . , 32_n having respectively different I/O characteristics are configured by considering that the specimen W can be exchanged with one having different mechanical characteristics. In addition, the moment of inertia of the specimen W has the largest influence on the characteristic of the mechanical resonance, also among the parameters characterizing the mechanical characteristics of the specimen W. Therefore, each of the resonance suppression controllers 32_1, . . . , 32_n is constructed so as to be able to most effectively suppress mechanical resonance, assuming that the specimens having respectively different moment of inertias are connected to the dynamometer D. It should be noted that, in the engine bench system, since the specific sequence of constructing the resonance suppression controller so that the mechanical resonance is effectively suppressed based on the moment of inertia of the specimen is shown in Japanese Patent No. 5136247 by the applicants of the present disclosure, for example, a detailed explanation is omitted herein.

With the dynamometer control module 3, the I/O ports of the high-order controller 31, shaft torque sensor 81, rotational speed sensor 82 and inverter 7 are connected only to the $i^{th}$ resonance suppression controller 32a_i (i is any integer between 1 and n) selected by the design module 5 in the n-number of resonance suppression controllers 32a_1, . . . , 32a_n, as shown in FIG. 1. The base torque current command signal, shaft torque detection signal and rotational speed detection signal are thereby inputted to one resonance suppression controller 32_i selected by the design module 5. In addition, the torque current signal generated in this resonance suppression controller 32_i by inputting the base torque electrical current command signal, shaft torque detection signal and rotational speed detection signal is inputted to the inverter 7.

The design module 5 includes: a specimen characteristic acquisition unit 51 that acquires mechanical characteristics of the specimen W connected to the dynamometer D; a resonance suppression controller selection unit 52 that selects one from among the above n-number of resonance suppression controllers 32_1, . . . , 32_n based on the mechanical characteristics acquired by the specimen characteristic acquisition unit 51, and implements the selected resonance suppression controller 32_i in the dynamometer control module 3; and an operation verification unit 53 that verifies the effect of the resonance suppression controller 32_i selected by the resonance suppression controller selection unit 52.

Figure 2:
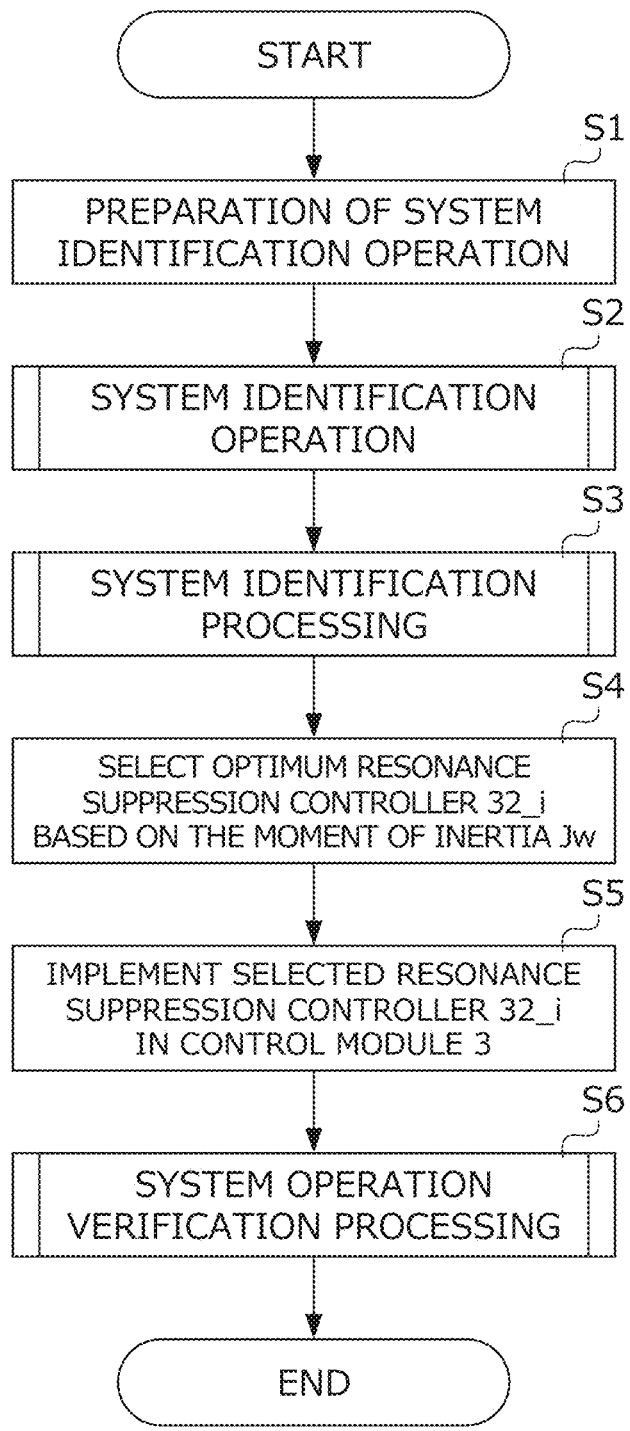
FIG. 2 is a flowchart showing a specific sequence of selecting a resonance suppression controller according to a specimen by a design module.

FIG. 2 is a main flowchart showing a specific sequence of selecting a resonance suppression controller according to the specimen by the design module 5. The processing shown in FIG. 2 is executed in the design module 5, after the work of connecting a new specimen for which the mechanical characteristics thereof are unknown to the dynamometer D is carried out by the operator, on the event of a manipulation for starting processing of selecting a resonance suppression controller most suited to this new specimen being carried out by the operator.

First, in Step S1, the specimen characteristic acquisition unit 51 performs preparation of system identification operation described later. More specifically, the specimen characteristic acquisition unit 51 acquires the value of at least one operating parameter necessitated in order to execute system identification operation. Herein, operating parameters include the upper limit revolution speed (rpm) of the engine during execution of system identification operation, maximum load torque (Nm) of the engine, random excitation amplitude (Nm) used in excitation operation described later, etc. It should be noted that the specimen characteristic acquisition unit 51 may acquire the values of these operating parameters based on a numerical input operation by the operator each time, or may use values set in advance.

Next, in Step S2, the specimen characteristic acquisition unit 51 executes system identification operation of recording data necessitated in order to estimate the mechanical characteristic parameters of the specimen W, by experimentally operating the specimen W and dynamometer D based on the values of operating parameters acquired in Step S1.

Figure 3:
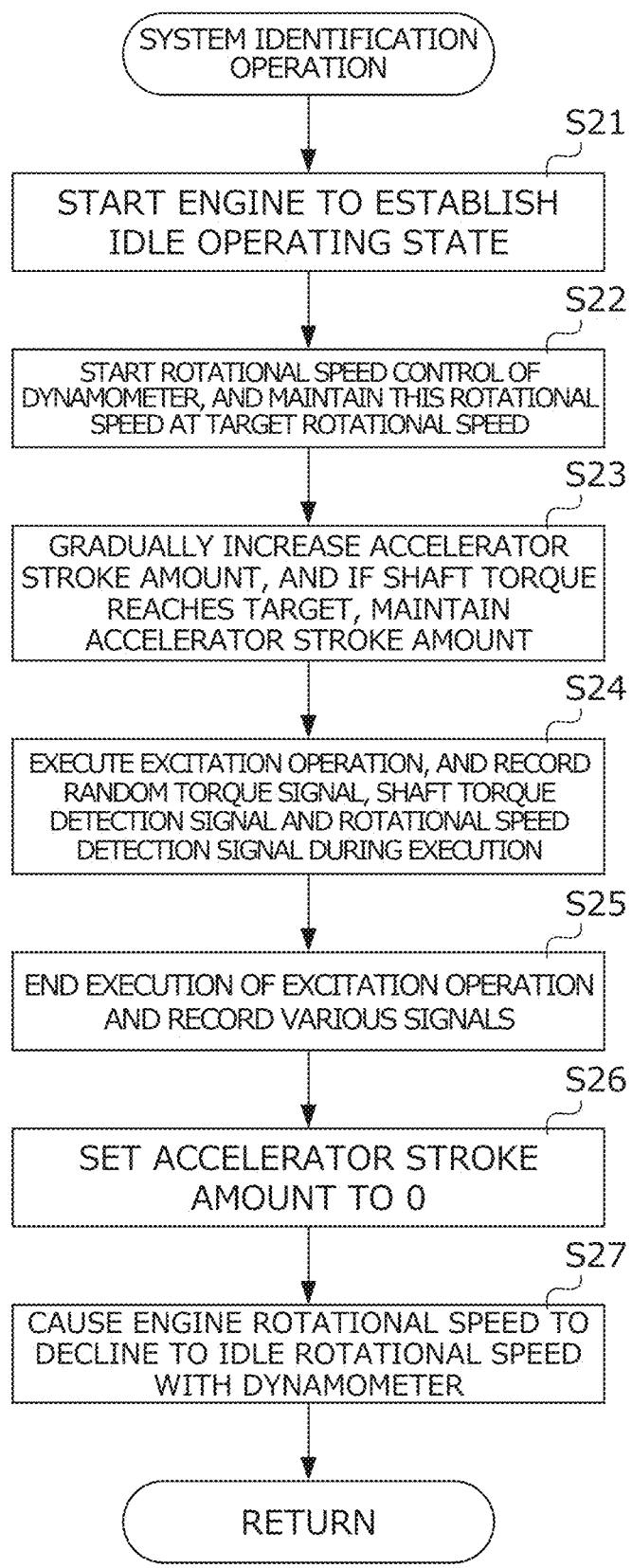
FIG. 3 is a flowchart showing a specific sequence of a system identification operation executed by a specimen characteristic acquisition unit.

FIG. 3 is a flowchart showing a specific sequence of system identification operation executed by the specimen characteristic acquisition unit 51.

First, in Step S21, the specimen characteristic acquisition unit 51 sends a signal commanding starting of the engine E to the engine control module 2. In response to receiving this command signal, the engine control module 2 starts the engine E by driving a starter (not shown) of the engine E, and consequently, maintains the engine E at the idle operating state.

Next, in Step S22, the specimen characteristic acquisition unit 51 sends a signal commanding start of the rotational speed control to the higher-order controller 31. In response to receiving this command signal, the higher-order controller 31 starts rotational speed control of the dynamometer D using the rotational speed detection signal, and maintains the rotational speed of the dynamometer D at a predetermined target rotational speed.

Next, in Step S23, the specimen characteristic acquisition unit 51 sends a signal for gradually increasing the accelerator stroke amount of the engine E to the engine control module 2. In response to receiving this command signal, the engine control module 2 causes the accelerator stroke amount to gradually become larger. Herein, when making the accelerator stroke amount larger under the rotational speed control of the dynamometer D by the higher-order controller 31, the shaft torque at the connecting shaft S also becomes larger. Therefore, the engine control module 2, in the case of the shaft torque reaching the predetermined target value by gradually increasing the accelerator stroke amount, maintains the accelerator stroke amount at the magnitude of this time, and maintains the shaft torque detected by the shaft torque sensor 81 at this target value.

Next, in Step S24, the specimen characteristic acquisition unit 51 sends a signal commanding execution of excitation operation of the dynamometer D to the higher-order controller 31. In response to receiving this command signal, the higher-order controller 31 executes excitation operation of the dynamometer D over a predetermined time. With excitation operation, the higher-order controller 31 inputs to the inverter a signal obtained by overlapping the random torque signal oscillating at a random frequency within a random excitation amplitude set in advance, on a base torque electrical current command signal. In addition, in Step S24, the specimen characteristic acquisition unit 51 executes excitation operation of the dynamometer D, as well as acquiring a random torque signal inputted to the inverter 7 during execution of this excitation operation, and the shaft torque detection signal and rotational speed detection signal during execution of this excitation operation, and recording on a storage medium (not shown) this random torque signal, shaft torque detection signal and rotational speed detection signal.

Next, in Step S25, the specimen characteristic acquisition unit 51, after executing excitation operation of the dynamometer D over a predetermined time, sends to the higher-order controller 31 a signal commanding the end of excitation operation. In response to receiving this command signal, the higher-order controller 31 ends excitation operation. In addition, the specimen characteristic acquisition unit 51, in response to ending the excitation operation, ends recording of the random torque signal, shaft torque detection signal and rotational speed detection signal.

Next, in Step S26, the specimen characteristic acquisition unit 51 sends to the engine control module 2 a signal for setting the accelerator stroke amount of the engine E to 0. In response to receiving this command signal, the engine control module 2 sets the accelerator stroke amount to 0.

Next, in Step S27, the specimen characteristic acquisition unit 51 sends to the higher-order controller 31 a signal commanding a decline in the rotational speed of the dynamometer D. In response to receiving this command signal, the higher-order controller 31 causes the rotational speed of the engine E to decline to the idle rotational speed under the rotational speed control of the dynamometer D, and then ends the system identification operation of FIG. 3.

Referring back to FIG. 2, in Step S3, the specimen characteristic acquisition unit 51 executes system identification processing for estimating the mechanical characteristic parameters of the specimen W, based on the data of the random torque signal, shaft torque detection signal and rotational speed detection signal recorded in Step S2.

Figure 4:
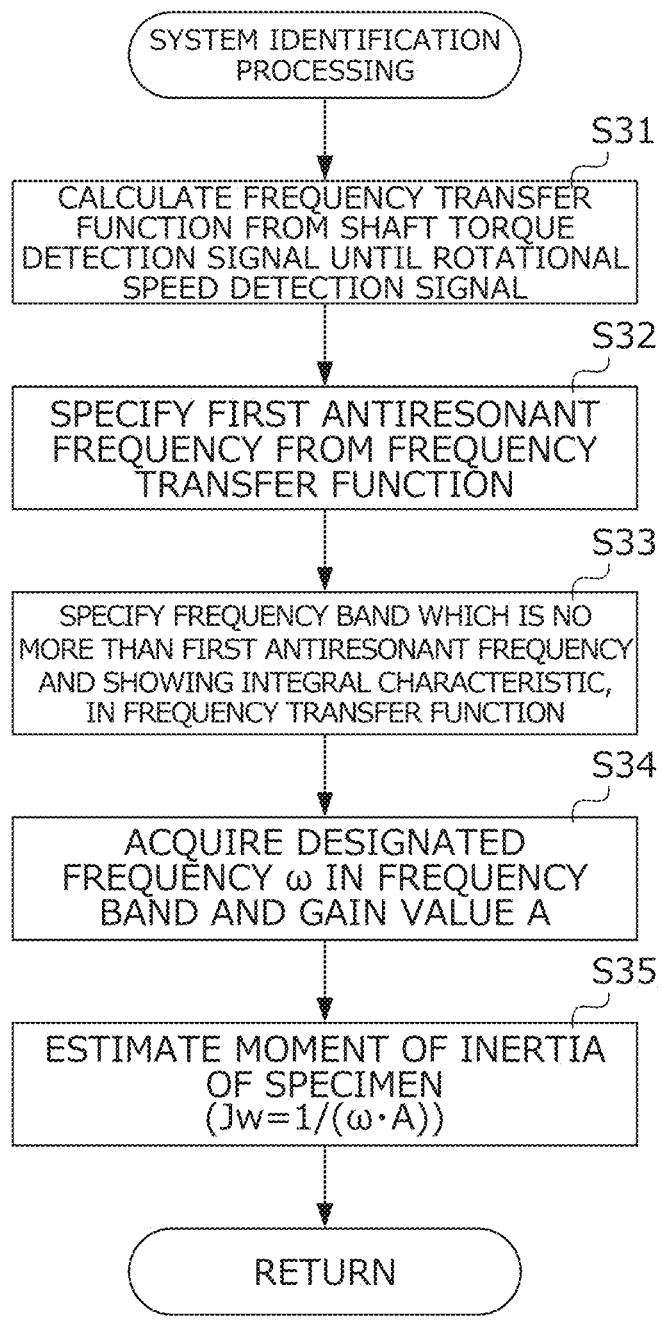
FIG. 4 is a flowchart showing a specific sequence of system identification processing executed by a specimen characteristic acquisition unit.

FIG. 4 is a flowchart showing the specific sequence of system identification processing executed by the specimen characteristic acquisition unit 51.

Figure 5:
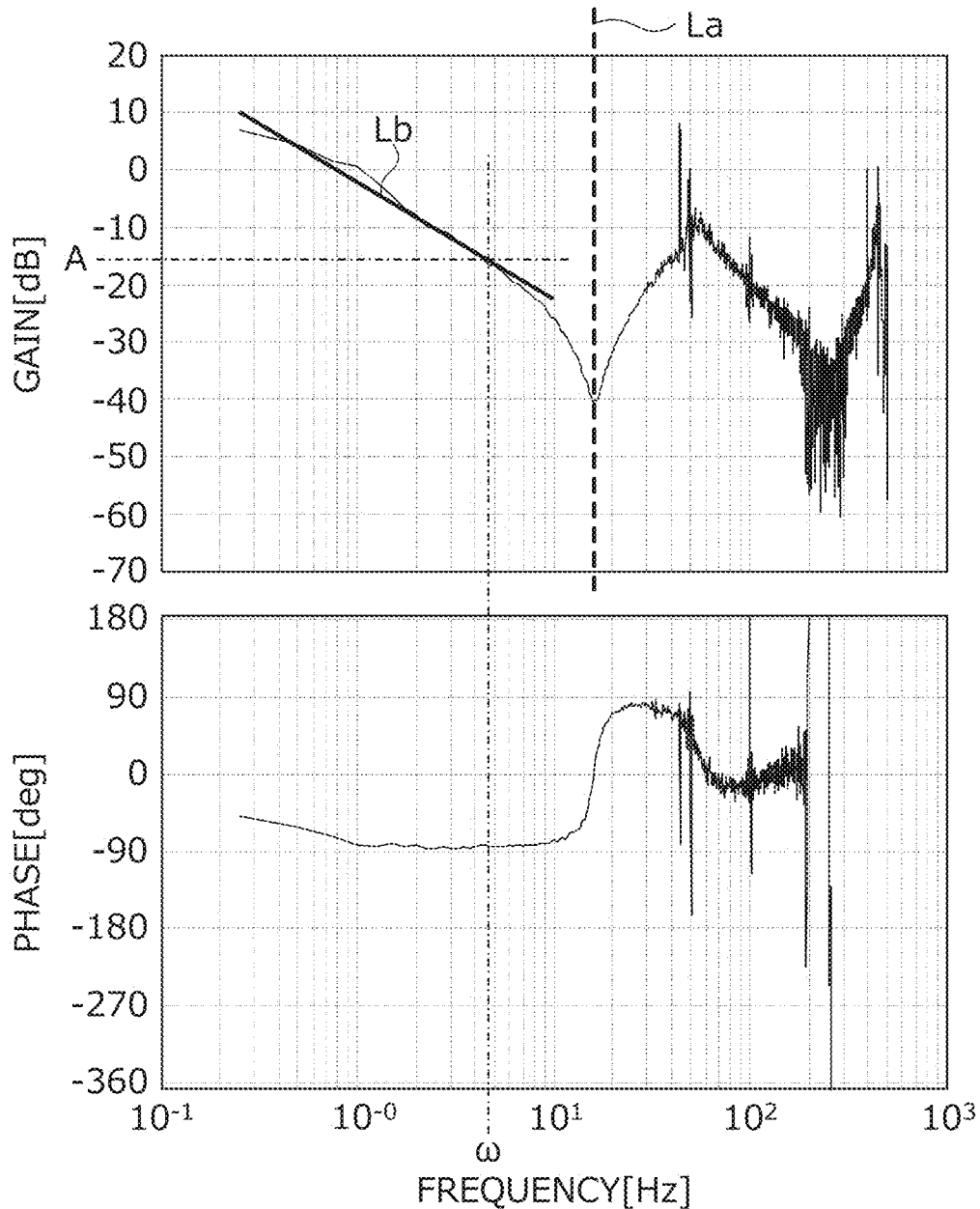
FIG. 5 is a view showing a specific example of a frequency transfer function calculated in system identification processing.

First, in Step S31, the specimen characteristic acquisition unit 51 calculates the frequency transfer function from the shaft torque detection signal to the rotational speed detection signal such as that exemplified in FIG. 5, by using the data recorded in the system identification operation of Step S2. It should be noted that a known method such as fast Fourier transform can be used to calculate the above-mentioned frequency transfer function from the time series data of the shaft torque detection signal and rotational speed detection signal.

Next, in Step S32, the specimen characteristic acquisition unit 51 specifies a first antiresonant frequency, which is the lowest order antiresonant frequency (refer to bold dotted line La in FIG. 5), from the frequency transfer function calculated in Step S31.

Next, in Step S33, the specimen characteristic acquisition unit 51 specifies the frequency range (refer to bold line Lb in FIG. 5) which is no more than the first antiresonant frequency specified in Step S32 and showing the integral characteristic, in the frequency transfer function calculated in Step S31.

Next, in Step S34, the specimen characteristic acquisition unit 51 acquires a designated frequency $\omega$ in the frequency band specified in Step S33 and the gain value A of the frequency transfer function at this designated frequency $\omega$.

Next, in Step S35, the specimen characteristic acquisition unit 51 calculates the value of the moment of inertia Jw of the specimen W which is one among the plurality of characteristic parameters indicating the mechanical characteristics of the specimen W, by performing computation according to Formula (1) below, using the designated frequency $\omega$ and gain value A acquired in Step S34.

$$Jw=1/(\omega \cdot A) \qquad (1)$$

Referring back to FIG. 2, in Step S4, the resonance suppression controller selection unit 52 selects the optimal one among the n-number of resonance suppression controllers 32_1, ..., 32_n as the resonance suppression controller 32_i to be implemented in the dynamometer control module 3, based on the value of the moment of inertia Jw of the specimen W calculated by the system identification processing of Step S3. More specifically, in the resonance suppression controller selection unit 52, as shown in FIG. 6, a table is stored that associates the respective resonance suppression controllers 32_1, 32_2, ..., 32_n and the numerical ranges [a0~a1], [a1~a2], ..., [an-1~an] of moment of inertia of the specimen W for which the resonance suppression function thereof is assured. It should be noted that the numerical range of moment of inertia is set to a range about ±20%, for example, centered around a set value for the moment of inertia of the specimen referenced upon constructing the resonance suppression controller. The resonance suppression controller selection unit 52 specifies the resonance suppression controller including the value of the moment of inertia Jw calculated by the system identification processing by referencing this table in the numerical range, and selects this as the resonance suppression controller 32_i implemented in the dynamometer control module 3.

Next, in Step S5, the resonance suppression controller selection unit 52 implements the resonance suppression controller 32_i selected in Step S4 in the dynamometer control module 3. The base torque command signal generated by the higher-order controller 31, shaft torque detection signal generated by the shaft torque sensor 81 and rotational speed detection signal generated by the rotational speed sensor 82 are thereby inputted to the resonance suppression controller 32_i. In addition, the torque electrical current command signal generated by the resonance suppression controller 32_i is inputted to the inverter 7.

Next, in Step S6, the operation verification unit 53 executes system operation verification processing of verifying whether the implemented resonance suppression controller 32_i is appropriately functioning.

Figure 7:
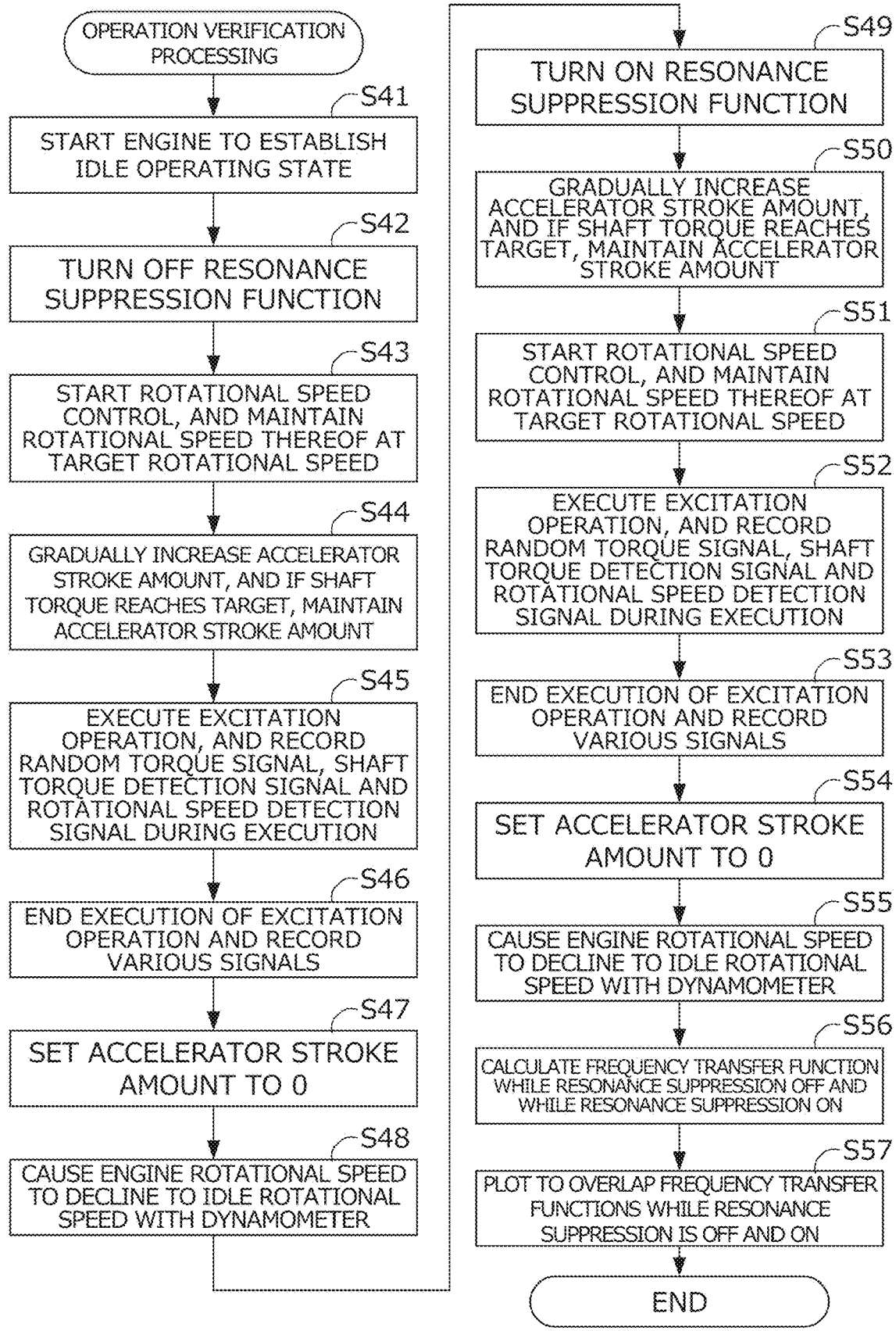
FIG. 7 is a flowchart showing a specific sequence of system operation verification processing executed by an operation verification unit.

FIG. 7 is a flowchart showing the specific sequence of system operation verification processing executed by the operation verification unit 53.

First, in Step S41, the operation verification unit 53 sends a signal commanding starting of the engine E to the engine control module 2. In response to receiving this command signal, the engine control module 2 starts the engine E by driving the start (not shown) of the engine E, and then maintains the engine E in an idle operating state.

Next, in Step S42, the operation verification unit 53 sends a signal for turning OFF the resonance suppression function to the dynamometer control module 3. In response to receiving this command signal, the dynamometer control module 3 turns OFF the function of the implemented resonance suppression controller 32_i. The base torque current command signal generated by the higher-order controller 31 is thereby inputted to the inverter 7 without going through the resonance suppression controller 32_i.

Next, in Step S43, the operation verification unit 53 sends a signal commanding start of the rotational speed control to the higher-order controller 31. In response to receiving this command signal, the higher-order controller 31 starts the rotational speed control of the dynamometer D using rotational speed detection signal, and maintains the rotational speed of the dynamometer D at a predetermined target rotational speed.

Next, in Step S44, the operation verification unit 53 sends a signal to cause the accelerator stroke amount of the engine E to gradually increase to the engine control module 2. In response to receiving this command signal, the engine control module 2 causes the accelerator stroke amount to gradually become larger, and in the case of the shaft torque reaching a predetermined target value, maintains the accelerator stroke amount at the magnitude of this time, and maintains the shaft torque detected by the shaft torque sensor 81 at this target value.

Next, in Step S45, the operation verification unit 53 sends a signal commanding execution of excitation operation of the dynamometer D to the higher-order controller 31. In response to receiving this command signal, the higher-order controller 31 executes excitation operation of the dynamometer D over a predetermined time, according to a sequence similar to Step S24 in FIG. 3. In addition, in Step S45, the operation verification unit 53 executes excitation operation of the dynamometer D, as well as acquiring the random torque signal inputted to the inverter 7 during execution of this excitation operation, and the shaft torque detection signal and rotational speed detection signal during execution of this excitation operation, and recording in a storage medium (not shown) this random torque signal, shaft torque detection signal and rotational speed detection signal. Data during excitation operation in a state turning OFF the function of the resonance suppression controller 32_i is thereby recorded.

Next, in Step S46, the operation verification unit 53, after executing excitation operation of the dynamometer D over a predetermined time, sends a signal commanding end of excitation operation to the higher-order controller 31. In response to receiving this command signal, the higher-order controller 31 ends excitation operation. In addition, the operation verification unit 53 ends recording of the random torque signal, shaft torque detection signal and rotational speed detection signal, in response to ending excitation operation.

Next, in Step S47, the operation verification unit 53 sends a signal setting the accelerator stroke amount of the engine E to 0 to the engine control module 2. In response to receiving this command signal, the engine control module 2 sets the accelerator stroke amount to 0.

Next, in Step S48, the operation verification unit 53 sends a signal commanding a decline in the rotational speed of the dynamometer D to the higher-order controller 31. In response to receiving this command signal, the higher-order controller 31 causes the rotational speed of the engine E and dynamometer D to lower to the idle rotational speed, under the rotational speed control of the dynamometer D.

Next, in Step S49, the operation verification unit 53 sends a signal to turn ON the resonance suppression function to the dynamometer control module 3. In response to receiving this command signal, the dynamometer control module 3 turns ON the function of the implemented resonance suppression controller 32_i. The base torque current command signal generated by the higher-order controller 31 is thereby inputted to the inverter 7 through the resonance suppression controller 32_i. In this way, the operation verification unit 53 can suppress the load acting on equipment such as the specimen W and dynamometer D, by the rotational speed of the dynamometer D and engine E declining to the idle rotational speed, entering a low load and low-rotational speed state, and then turning ON the resonance suppression function.

Next, in Step S50, the operation verification unit 53 sends a signal commanding start of the rotational speed control to the higher-order controller 31. In response to receiving this command signal, the higher-order controller 31 starts the rotational speed control of the dynamometer D using the rotational speed detection signal, and maintains the rotational speed of the dynamometer D at a predetermined target rotational speed.

Next, in Step S51, the operation verification unit 53 sends a signal to gradually increase the accelerator stroke amount of the engine E to the engine control module 2. In response to receiving this command signal, the engine control module 2 causes the accelerator stroke amount to gradually become larger, and in the case of the shaft torque reaching a predetermined target value, maintains the accelerator stroke amount at the magnitude of this time, and maintains the shaft torque detected by the shaft torque sensor 81 at this target value.

Next, in Step S52, the operation verification unit 53 sends a signal commanding execution of the excitation operation of the dynamometer D to the higher-order controller 31. In response to receiving this command signal, the higher-order controller 31 executes excitation operation of the dynamometer D over a predetermined time according to a sequence similar to Step S24 in FIG. 3. In this excitation operation, the higher-order controller 31 inputs to the resonance suppression controller 32_i a signal obtained by overlapping the random torque signal oscillating at a random frequency within a random excitation amplitude set in advance on the base torque electrical current command signal, and inputs the torque electrical current command signal generated by this resonance suppression controller 32_i to the inverter 7. In addition, in Step S52, the operation verification unit 53 executes excitation operation of the dynamometer D, as well as acquiring the random torque signal inputted to the inverter 7 during execution of this excitation operation, and shaft torque detection signal and rotational speed detection signal during execution of this excitation operation, and recording in a storage medium (not shown) this random torque signal, shaft torque detection signal and rotational speed detection signal. The data during excitation operation in a state turning ON the function of the resonance suppression controller 32_i is thereby recorded.

Next, in Step S53, the operation verification unit 53, after executing excitation operation of the dynamometer D over a predetermined time, sends a signal commanding ending of excitation operation to the higher-order controller 31. In response to receiving this command signal, the higher-order controller 31 ends excitation operation. In addition, the operation verification unit 53, in response to ending excitation operation, ends the recording of the random torque signal, shaft torque detection signal and rotational speed detection signal.

Next, in Step S54, the operation verification unit 53 sends a signal to set the accelerator stroke amount of the engine E to 0 to the engine control module 2. In response to receiving this command signal, the engine control module 2 sets the accelerator stroke amount to 0.

Next, in Step S55, the operation verification unit 53 sends a signal commanding a decline in the rotational speed of the dynamometer D to the higher-order controller 31. In response to receiving this command signal, the higher-order controller 31 causes the rotational speeds of the dynamometer D and engine E decline to the idle rotational speed, under the rotational speed control of the dynamometer D.

Next, in Step S56, the operation verification unit 53 calculates the frequency transfer function from the shaft torque detection signal until the rotational speed detection signal in a state turning OFF the function of the resonance suppression controller 32_i using the data recorded in Step S45, according to a sequence similar to Step S31 in FIG. 4, and further calculates the frequency transfer function from the shaft torque detection signal until the rotational speed detection signal in a state turning ON the function of the resonance suppress controller 32_i using the data recorded in Step S52.

Figure 8:
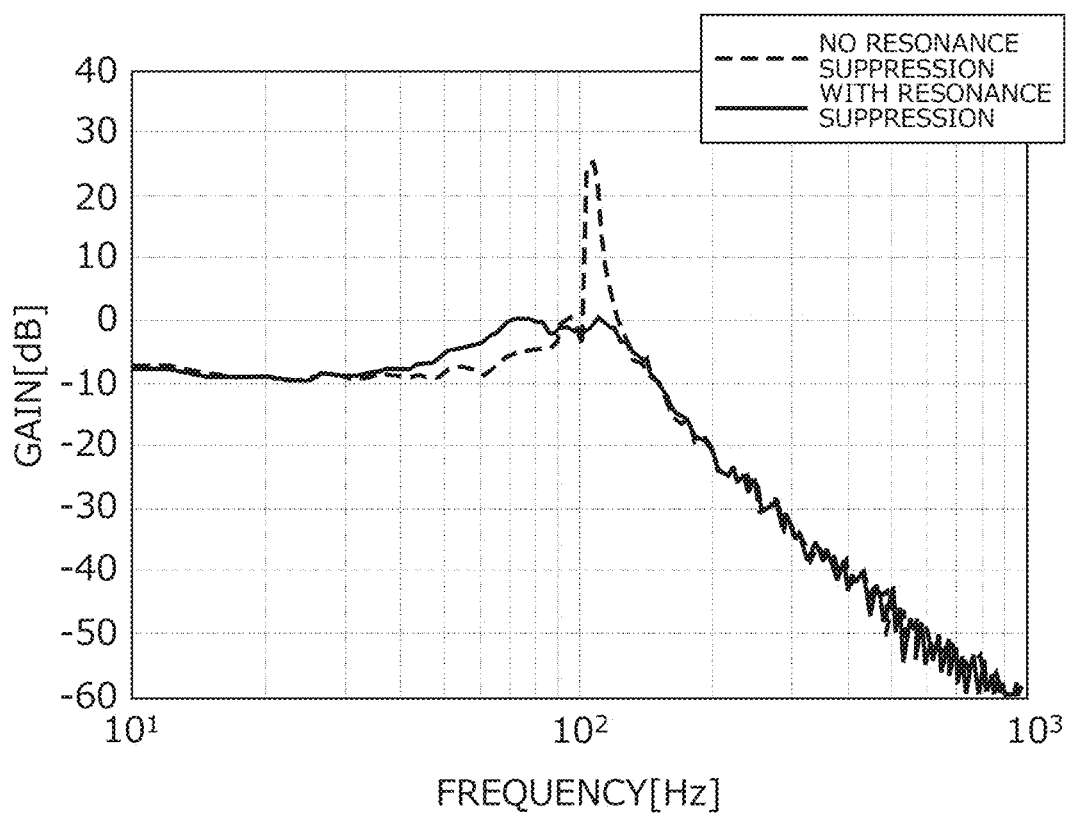
FIG. 8 is a graph plotting two frequency transfer functions to be overlapped.

Next, in Step S57, the operation verification unit 53 displays a graph made by plotting to overlap the above two frequency transfer functions on a display in a form such as that shown in FIG. 8, for example. The operator can thereby determine whether the resonance suppression controller 32_i is effectively functioning. In other words, the operator can determine through sight whether the peak for the gain of the resonance frequency expressed in a state turning OFF the function of the resonance suppression controller 32_i is sufficiently reduced in a state turning ON the function of the automatically selected resonance suppression controller 32_i. It should be noted that the processing in Step S57 may be automated in order to lighten the load on the operator. In this case, the operation verification unit 53 determines whether the resonance suppression controller 32_i is effectively functioning, by comparing between the two frequency transfer functions.

According to the overall control device 1 of the testing system SS according to the present embodiment, the following effects are exerted.

(1) The dynamometer control module 3 of the overall control device 1 includes the plurality of resonance suppression controllers 32_1, ..., 32_n having the respectively different I/O characteristics. In addition, the design module 5 of the overall control device 1 acquires the value of the moment of inertia Jw of the specimen W connected to the dynamometer D by the specimen characteristic acquisition unit 51, selects one among the plurality of resonance suppression controllers 32_1, ..., 32_n by the resonance suppression controller selection unit 52, and implements the selected resonance suppression controller 32_i in the dynamometer control module 3. Therefore, according to the overall control device 1, even in a case of the specimen W connected to the dynamometer D being exchanged with a new one, since the resonance suppression controller 32_i according to the mechanical characteristic of this new specimen is automatically selected, it is possible to quickly start testing without requiring to newly reset a resonance suppression controller according to the specimen. In addition, the overall control device 1 can obtain a stable resonance suppression effect irrespective of the skill of the operator, by automatically selecting a controller according to the value of the moment of inertia Jw of the specimen from among a plurality of controllers prepared in advance, as the resonance suppression controller.

(2) Generally, upon designing a resonance suppression controller, in addition to the moment of inertia of the specimen connected to the dynamometer D, the value of characteristic parameters such as the spring constant and attenuation constant are also necessary; however, the value of the moment of inertia of the specimen among these characteristic parameters has a great influence on the resonance suppression effect by the resonance suppression controller. Therefore, the overall control device 1 focuses on the moment of inertia Jw among this plurality of characteristic parameters, and selects the resonance suppression controller according to the value of the moment of inertia Jw. It is thereby possible to obtain a high resonance suppression effect, while minimizing the number of resonance suppression controllers prepared in advance.

(3) With the overall control device 1, the specimen characteristic acquisition unit 51 executes excitation operation of the dynamometer D in response to a command operation from the operator, as well as acquiring data including the shaft torque detection signal and rotational speed detection signal during execution of this excitation operation, and further calculating the value of the moment of inertia Jw based on the acquired data. In other words, the overall control device 1 can perform from acquisition of the value of the moment of inertia Jw of the specimen W until selection of a resonance suppression controller according to the value of this moment of inertia Jw entirely automatically. Consequently, according to the overall control device 1, since the labor for the operator to perform testing for identifying the value of the moment of inertia of the specimen W, and the labor for inputting the acquired value of the moment of inertia Jw are saved, the convenience is high.

Second Embodiment

Figure 9:
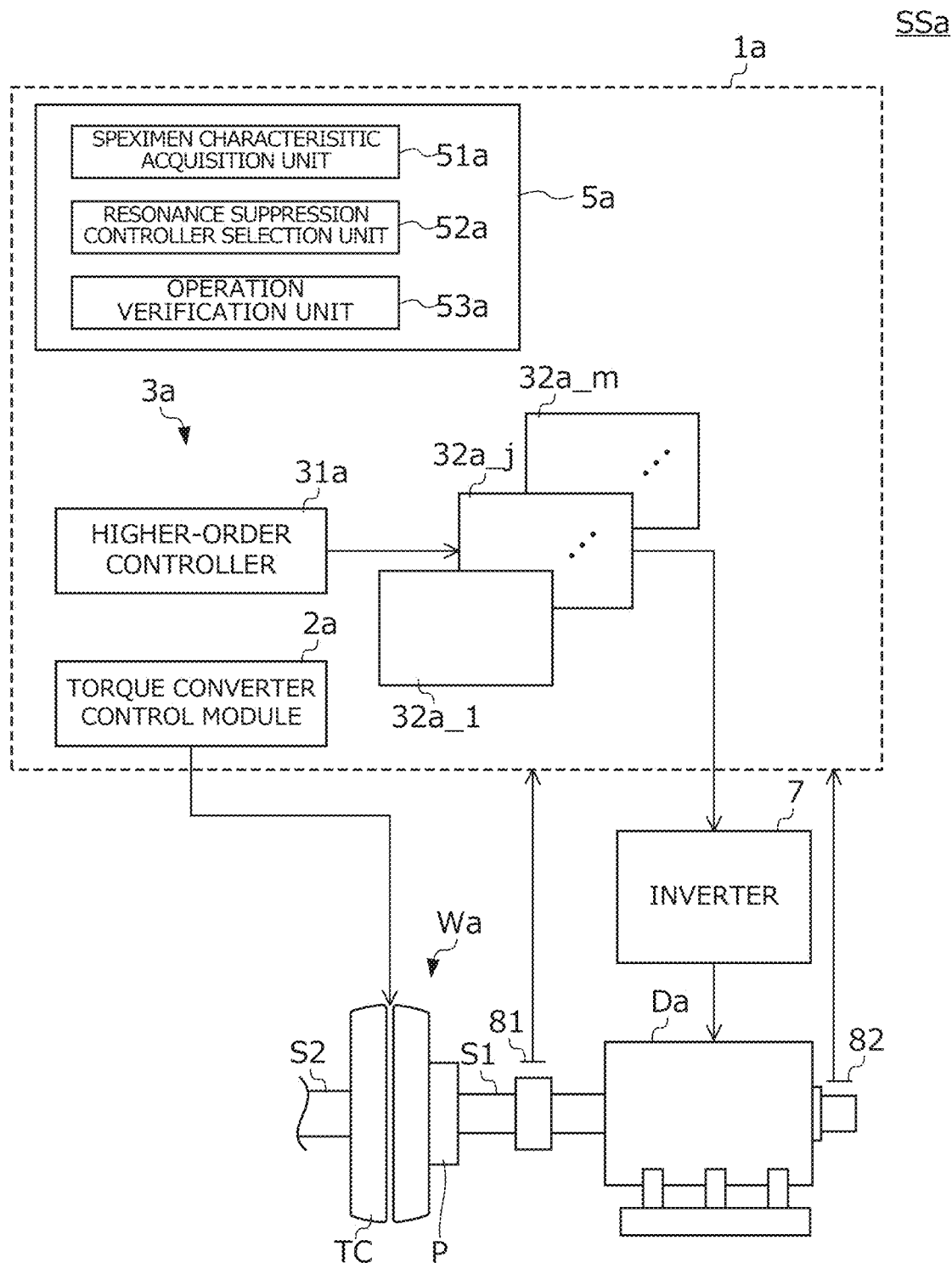
FIG. 9 is a view showing the configuration of a testing system and an overall control device thereof according to a second embodiment of the present invention.

Hereinafter, a second embodiment of the present invention will be explained in detail while referencing the drawings. FIG. 9 is a view showing the configurations of a testing system SSa and an overall control device 1a thereof according to the present embodiment. It should be noted that the present embodiment explains a case of applying the present invention to a testing system, a so-called drive train bench system, related to a drive train made with the drive train equipped to a vehicle as the specimen as shown in FIG. 9. It should be noted that, hereinafter, the same reference symbols are attached for configurations which are the same as the first embodiment, and detailed explanations thereof are omitted.

The testing system SSa includes: a specimen Wa including an input shaft S1 and output shaft S2, a dynamometer D1 coupled to the input shaft S1 of this specimen Wa via a shaft torque sensor 81, and an overall control device 1a which is a computer system that controls this specimen Wa and dynamometer Da. It should be noted that, in FIG. 9, illustration of configurations in the testing system SSa before the output shaft S2 of the specimen Wa is omitted.

The specimen Wa includes the input shaft S1, output shaft S2, and torque converter TC which amplifies and transmits the torque between this input shaft S1 and output shaft S2. The shaft torque sensor 81 has one end side coupled by a coupling (not shown) with the input shaft S1, and the other end side coupled by a coupling (not shown) with the output shaft of the dynamometer Da.

The dynamometer Da and specimen Wa are mechanically coupled so as to be coaxial by this shaft torque sensor 81. It should be noted that, in the mechanical system configured by coupling this dynamometer Da, shaft torque sensor 81 and specimen Wa, the main inertial elements are the dynamometer Da, drive plate P of the torque converter TC and pump impeller (not shown), and the main spring element is the thinnest shaft end of the output shaft of the dynamometer Da. In addition, this mechanical system includes a spring element, and thus mechanical resonance can occur similarly to the engine bench system of the first embodiment.

The overall control device 1 that is the computer is configured by a torque computer control module 2a which controls a speed-change operation of the specimen Wa; a dynamometer control module 3a which generates a torque electrical-current command signal based on the shaft torque detection signal sent from the shaft torque sensor 81 and the rotational speed detection signal sent from the rotational speed sensor 82; and a design module 5a which acquires a mechanical characteristic of the specimen Wa connected to the dynamometer Da, and constructs a dynamometer control module 3a suited to the mechanical characteristic of this specimen Wa.

The dynamometer control module 3a includes: a higher-order controller 31a, and m-number (m is an integer of at least 2) of resonance suppression controllers $32a\_1$, $32a\_2$, ..., $32a\_m$ having respectively different I/O characteristics.

The higher-order controller 31a generates a base torque electrical-current command signal which is a high-order command signal relative to the torque electrical current signal in accordance with a predetermined algorithm. More specifically, the higher-order controller 31a generates a base torque electrical-current command signal in accordance with a known control algorithm such as shaft torque control using the shaft torque detection signal, and rotational speed control using the rotational speed detection signal.

The resonance suppression controllers $32a\_1$, ..., $32a\_m$ respectively have a resonance suppression function of generating a torque electrical-current command signal so that the mechanical resonance which can occur in the above-mentioned mechanical system between the specimen Wa and dynamometer Da is suppressed, when the base torque electrical-current command signal, shaft torque detection signal, and rotational speed detection signal are inputted. In addition, this m-number of resonance suppression controllers $32a\_1$, ..., $32a\_m$ have respectively different I/O characteristics from the base torque electrical-current command signal, shaft torque detection signal and rotational speed detection signal until the torque electrical current command signal.

However, the specimen Wa, which is the main inertial element of the above-mentioned mechanical system, can be appropriately exchanged by the operator, upon changing the vehicle type defined as the testing target, for example, similarly to the specimen W of the first embodiment. Therefore, the resonance suppression controllers $32a\_1$, ..., $32a\_m$ having respectively different I/O characteristics are configured in the dynamometer control module 3a, considering that the specimen Wa can be exchanged with one having a different mechanical characteristic. In addition, the moment of inertia of the specimen Wa among the parameters characterizing the mechanical characteristic of the specimen Wa has the largest influence on the characteristic of the mechanical resonance. Therefore, the respective resonance suppression controllers $32a\_1$, ..., $32a\_n$ are tuned so as to be able to most effectively suppress the mechanical resonance, assuming that specimens having respectively different moment of inertias are connected to the dynamometer Da. It should be noted that, in the drive train bench system, since the specific sequence of constructing the resonance suppression controller so that mechanical resonance is effectively suppressed based on the moment of inertia of the specimen is shown in Japanese Patent No. 5839154 by the applicants of the present disclosure, for example, a detailed explanation is omitted herein.

With the dynamometer control module 3a, the I/O ports of the high-order controller 31a, shaft torque sensor 81, rotational speed sensor 82 and inverter 7 are connected only to the $j^{th}$ resonance suppression controller $32a\_j$ (j is any integer between 1 and m) selected by the design module 5a in the m-number of resonance suppression controllers $32a\_1$, ..., $32a\_m$, as shown in FIG. 9. The base torque electrical-current command signal, shaft torque detection signal and rotational speed detection signal are thereby inputted to the one resonance suppression controllers $32a\_j$ selected by the design module 5a. In addition, by inputting the base torque electrical-current command signal, shaft torque detection signal and rotational speed detection signal, the torque electrical current signal generated by this resonance suppression controller 32a_j is inputted to the inverter 7.

Figure 10:
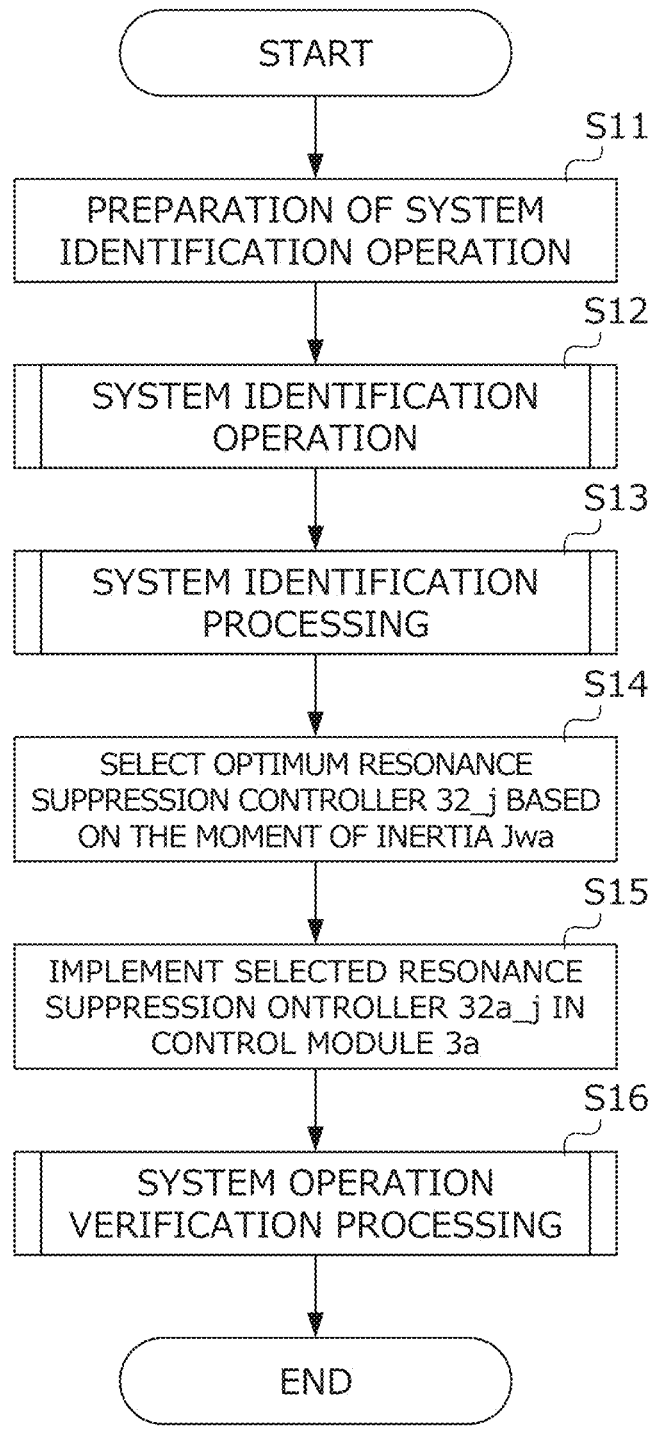
FIG. 10 is a flowchart showing a specific sequence for selecting a resonance suppression controller according to a specimen by a design module.

FIG. 10 is a main flowchart showing a specific sequence of selecting a resonance suppression controller according to the specimen by the design module 5a. The processing shown in FIG. 10 is executed in the design module 5a, after work to couple a new specimen having unknown mechanical characteristics to the dynamometer Da is performed by the operator, on the event of an operation for starting processing to select the resonance suppression controllers most suited to this new specimen being performed by the operator.

First, in Step S11, a specimen characteristic acquisition unit 51a performs preparation of a system identification operation described later. More specifically, the specimen characteristic acquisition unit 51a acquires the value of at least one operating parameter necessitated in order to execute system identification operation. Herein, for the operating parameter, for example, there is a random excitation amplitude (Nm) that can be used in excitation operation. It should be noted that the specimen characteristic acquisition unit 51a may acquire the values of these operating parameters each time based on the numerical input operation by the operator, or may use values decided in advance.

Next, in Step S12, the specimen characteristic acquisition unit 51a executes a system identification operation for recording data necessitated in order to estimate a mechanical characteristic parameter of the specimen Wa, by experimentally operating the specimen Wa and dynamometer Da based on the operating parameters acquired in Step S11.

Figure 11:
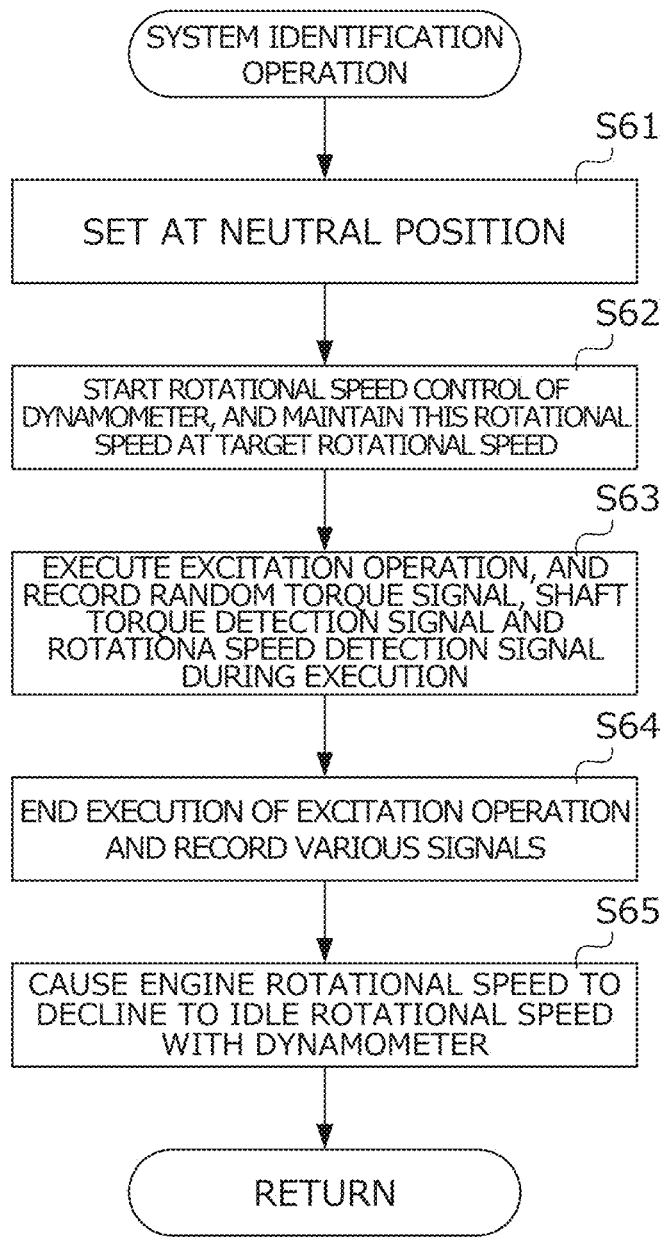
FIG. 11 is a flowchart showing a specific sequence of system identification operation executed by a specimen characteristic acquisition unit.

FIG. 11 is a flowchart showing a specific sequence of system identification operation executed by the specimen characteristic acquisition unit 51a.

First, in Step S61, the specimen characteristic acquisition unit 51a sends a signal setting the torque converter Tc to the neutral position in the torque converter control module 2a. In response to receiving this command signal, the torque converter control module 2a sets the torque converter TC to the neutral position, and releases the connection between the pump impeller and output shaft S2.

Next, in Step S62, the specimen characteristic acquisition unit 51a sends a signal commanding the start of the rotational speed control to the higher-order controller 31a. In response to receiving this command signal, the higher-order controller 31a starts rotational speed control of the dynamometer Da using the rotational speed detection signal, and maintains the rotational speed of the dynamometer Da at a predetermined target rotational speed.

Next, in Step S63, the specimen characteristic acquisition unit 51a sends a signal commanding execution of excitation operation of the dynamometer Da to the higher-order controller 31a. In response to receiving this command signal, excitation operation of the dynamometer Da is executed over a predetermined time according to the same sequence as Step S24 in FIG. 3 by the high-order controller 31a. In addition, in Step S63, the specimen characteristic acquisition unit 51a executes excitation operation of the dynamometer Da, as well as acquiring the random torque signal inputted to the inverter 7 during excitation of the his excitation operation, and shaft torque detection signal and rotational speed detection signal during execution of this excitation operation, and recording in a storage medium (not shown) this random torque signal, shaft torque detection signal and rotational speed detection signal.

Next, in Step S64, the specimen characteristic acquisition unit 51a sends a signal commanding the end of the excitation operation to the higher-order controller 31a, after executing the excitation operation of the dynamometer Da over a predetermined time. In response to receiving this command signal, the higher-order controller 31a ends the excitation operation. In addition, the specimen characteristic acquisition unit 51a, in response to ending the excitation operation, ends recording of the random torque signal, shaft torque detection signal and rotational speed detection signal.

Next, in Step S65, the specimen characteristic acquisition unit 51a sends the signal commanding a decline in the rotational speed of the dynamometer Da to the higher-order controller 31a. In response to receiving this command signal, the higher-order controller 31a ends the system identification operation of FIG. 11, after causing the rotational speed of the engine E to decline until the idle rotational speed under the rotational speed control of the dynamometer D.

Referring back to FIG. 10, in Step S13, the specimen characteristic acquisition unit 51a executes the system identification processing of estimating the mechanical characteristic parameters of the specimen Wa, based on the random torque signal, shaft torque detection signal and rotational speed detection signal recorded in Step S12. It should be noted that, in this system identification processing, the specimen characteristic acquisition unit 51a estimates the moment of inertia Jwa of the specimen Wa through the same sequence as FIG. 4.

Next, in Step S14, the resonance suppression controller selection unit 52a selects the optimum one among the m-number of resonance suppression controllers 32a_1, . . . , 32a_m as the resonance suppression controller 32a_i implemented in the dynamometer control module 3a, based on the value of the moment of inertia Jwa of the specimen Wa calculated by the system identification processing of Step S13. In the resonance suppression controller selection unit 52a, a similar table as FIG. 6 associating the respective resonance suppression controllers 32a_1, . . . , 32a_m with the numerical ranges of the moment of inertia of the specimen is stored. Therefore, the resonance suppression controller selection unit 52a specifies a resonance suppression controller including the moment of inertia Jwa calculated by the system identification processing by referencing this table in the numerical range, and selects this as the resonance suppression controller 32a_j implemented in the dynamometer control module 3a.

Next, in Step S15, the resonance suppression controller selection unit 52a implements the resonance suppression controller 32a_j selected in Step S14 in the dynamometer control module 3a. The base torque command signal generated by the higher-order controller 31a, shaft torque detection signal generated by the shaft torque sensor 81, and rotational speed detection signal generated by the rotational speed sensor 82 are thereby inputted to the resonance suppression controller 32a_j. In addition, the torque electrical-current command signal generated by the resonance suppression controller 32a_j is inputted to the inverter 7.

Next, in Step S16, the operation verification unit 53a executes system operation verification processing of verifying whether the implemented resonance suppression controller 32a_j functions appropriately.

Figure 12:
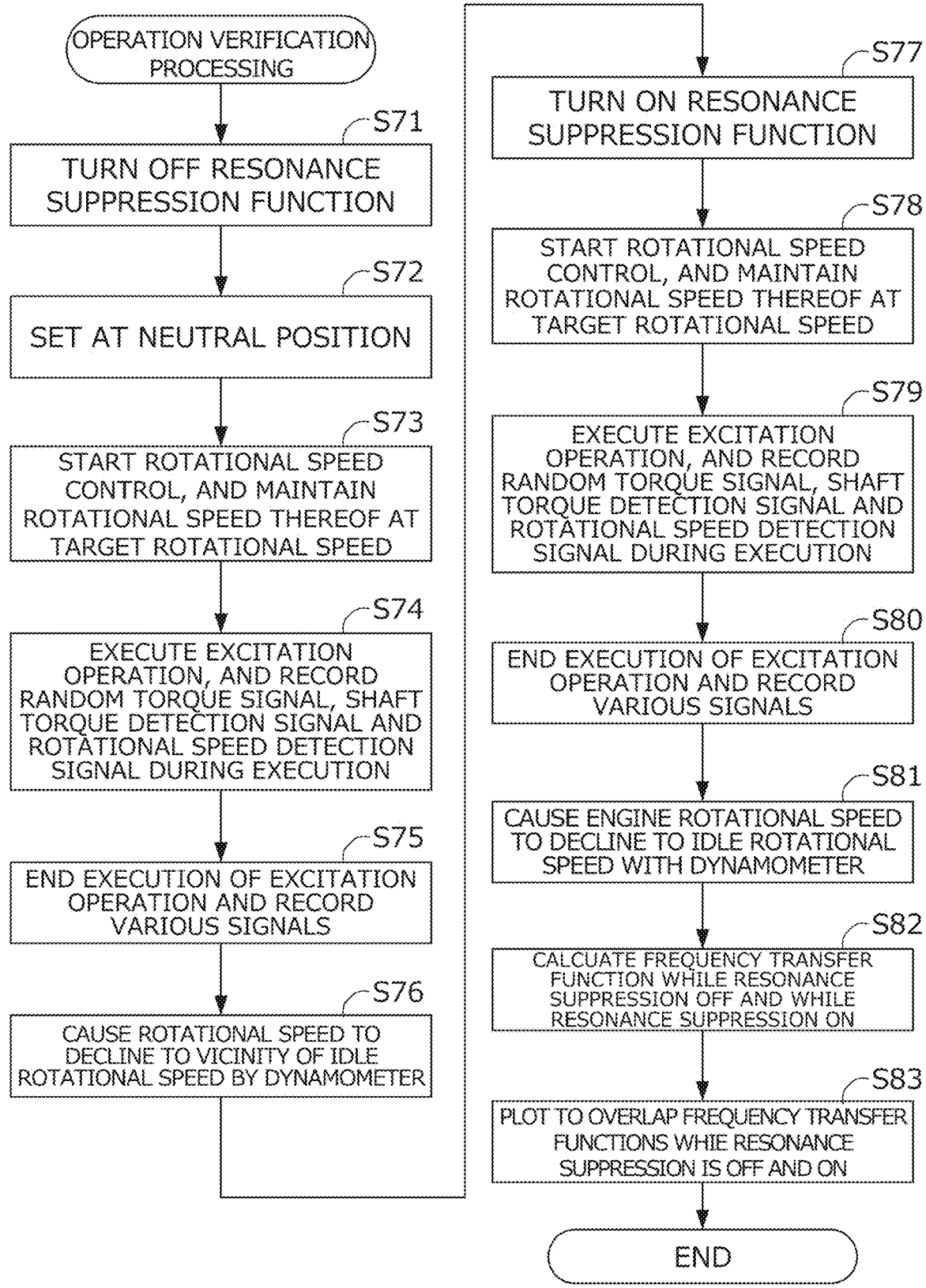
FIG. 12 is a flowchart showing a specific sequence of system operation verification processing executed by an operation verification unit.

FIG. 12 is a flowchart showing a specific sequence of the system operation verification processing executed by the operation verification unit 53a.

First, in Step S71, the operation verification unit 53a sends a signal turning OFF the resonance suppression function to the dynamometer control module 3a. In response to receiving this command signal, the dynamometer control module 3a turns OFF the function of the implemented resonance suppression controller 32a_j. The base torque electrical-current command signal generated by the higher-order controller 31a is thereby inputted to the inverter 7 without going through the resonance suppression controller 32a_j.

Next, in Step S72, the operation verification unit 53a sends a signal setting the torque converter TC to the neutral position in the torque converter control module 2a. In response to receiving this command signal, the torque converter control module 2a sets the torque converter TC to the neutral position, and releases connection between the pump impeller and output shaft S2.

Next, in Step S73, the operation verification unit 53a sends the signal commanding start of rotational speed control to the higher-order controller 31a. In response to receiving this command signal, the higher-order controller 31a starts the rotational speed control of the dynamometer Da using the rotational speed detection signal, and maintains the rotational speed of the dynamometer Da at a predetermined target rotational speed.

Next, in Step S74, the operation verification unit 53a sends a signal commanding the execution of excitation operation of the dynamometer Da to the higher-order controller 31a. In response to receiving this command signal, the higher-order controller 31a executes excitation operation of the dynamometer Da over a predetermined time according to a sequence similar to Step S63 in FIG. 11. In addition, in this Step S74, the operation verification unit 53a executes the excitation operation of the dynamometer Da, as well as acquiring a random torque signal inputted to the inverter 7 during execution of this excitation operation, and the shaft torque detection signal and rotational speed detection signal during execution of this excitation operation, and recording in a storage medium (not shown) this random torque signal, shaft torque detection signal and rotational speed detection signal. Data during excitation operation in a state turning OFF the function of the resonance suppression controller 32a_j is thereby recorded.

Next, in Step S75, the operation verification unit 53a, after executing excitation operation of the dynamometer Da over a predetermined time, sends a signal commanding the end of excitation operation to the higher-order controller 31a. In response to receiving this command signal, the higher-order controller 31a ends the excitation operation. In addition, the operation verification unit 53a, in response to ending the excitation operation, ends recording of the random torque signal, shaft torque detection signal and rotational speed detection signal.

Next, in Step S76, the operation verification unit 53a sends a signal commanding a decline in the rotational speed of the dynamometer Da to the higher-order controller 31a. In response to receiving this command signal, the higher-order controller 31a causes the rotational speed of the dynamometer Da and specimen Wa under the rotational speed control of the dynamometer Da until the vicinity of the idle rotational speed (for example, 1000 rpm).

Next, in Step S77, the operation verification unit 53a sends a signal to turn ON the resonance suppression function to the dynamometer control module 3a. In response to receiving this command signal, the dynamometer control module 3a turns ON the function of the implemented resonance suppression controller 32a_j. The base torque electrical current command signal generated by the higher-order controller 31a is thereby inputted to the inverter 7 through the resonance suppression controller 32a_j. In this way, with the operation verification unit 53a, it is possible to suppress the load on equipment such as the specimen Wa and dynamometer Da, by the rotational speed of the dynamometer Da and specimen Wa declining to the vicinity of the idle rotational speed to enter a low load and low rotational speed state, and then turning ON the resonance suppression function.

Next, in Step S78, the operation verification unit 53a sends a signal commanding start of the rotational speed control to the higher-speed controller 31a. In response to receiving this command signal, the higher-order controller 31a starts rotational speed control of the dynamometer Da using the rotational speed detection signal, and maintains the rotational speed of the dynamometer Da at a predetermined target rotational speed.

Next, in Step S79, the operation verification unit 53a sends a signal commanding execution of the excitation operation of the dynamometer Da to the higher-order controller 31a. In response to receiving this command signal, the higher-order controller 31a executes excitation operation of the dynamometer Da over a predetermined time, according to a sequence similar to Step S63 in FIG. 11. With this excitation operation, the higher-order controller 31a inputs to the resonance suppression controller 32a_j a signal obtained by overlapping a random torque signal exciting at a random frequency within a random excitation amplitude set in advance on the base torque electrical-current command signal, and inputs the torque electrical-current command signal generated by this resonance suppression controller 32a_j to the inverter 7. In addition, in Step S79, the operation verification unit 53a executes excitation operation of the dynamometer Da, as well as acquiring the random torque signal inputted to the inverter 7 during execution of this excitation operation, and shaft torque detection signal and rotational speed detection signal during execution of this excitation operation, and recording in a storage medium (not shown) this random torque signal, shaft torque detection signal and rotational speed detection signal. The data during excitation operation in a state turning ON the function of the resonance suppression controller 32a_j is thereby recorded.

Next, in Step S80, the operation verification unit 53a, after executing the excitation operation of the dynamometer Da over a predetermined time, sends a signal commanding the end of the excitation operation to the higher-order controller 31a. In response to receiving this command signal, the higher-order controller 31a ends the excitation operation. In addition, the operation verification unit 53a, in response to ending the excitation operation, ends the recording of the random torque signal, shaft torque detection signal and rotational speed detection signal.

Next, in Step S81, the operation verification unit 53a sends a signal commanding stop of the dynamometer Da to the higher-order controller 31a. In response to receiving this command signal, the higher-order controller 31a causes the rotational speeds of the dynamometer Da and specimen Wa under the rotational speed control of the dynamometer Da to decline until the stop revolution speed (for example, 0 rpm).

Next, in Step S82, the operation verification unit 53a calculates the frequency transfer function from the shaft torque detection signal until the rotational speed detection signal in a state turning OFF the function of the resonance suppression controller 32a_j using data recorded in Step S74 according to a sequence similar to Step S31 in FIG. 4, and further calculates the frequency transfer function from the shaft torque detection signal until the rotational speed detection signal in a state turning ON the function of the resonance suppression controller 32a_j using the data recorded in Step S79.

Next, in Step S83, the operation verification unit 53a displays a graph plotted by overlapping the above-mentioned two frequency transfer functions on the display. The operator can thereby determine whether the resonance suppression controller 32a_j is effectively functioning. In other words, the operator can determine through sight whether a peak for the gain in the resonance frequency appearing in a state turning OFF the function of the resonance suppression controller 32a_j is sufficiently decreased in the state turning ON the function of the automatically selected resonance suppression controller 32a_j. It should be noted that the processing of Step S83 may be automated in order to lighten the load on the operator. In this case, the operation verification unit 53a determines whether the resonance suppression controller 32a_j is effectively functioning, by comparing the two frequency transfer functions.

According to the overall control device 1a of the testing system SSa of the present embodiment, the same effects as the overall control device 1a according to the above first embodiment are exerted.

EXPLANATION OF REFERENCE NUMERALS

S, Sa testing system
W, Wa specimen
S connecting shaft
S1 input shaft
D, Da dynamometer (electric motor)
1, 1a overall control device (control device)
3, 3a dynamometer control module
31, 31a higher-order controller
32_1, . . . , 32_n resonance suppression controller
32a_1, . . . , 32a_m resonance suppression controller
5, 5a design module
51, 51a specimen characteristic acquisition unit (specimen characteristic acquisition means)
52, 52a resonance suppression controller selection unit (resonance suppression controller selection means)
53, 53a operation verification unit
7 inverter
81 shaft torque sensor
82 rotational speed sensor

The invention claimed is:

1. A testing system that includes an electric motor connected to a specimen via a connecting shaft,
an inverter that supplies electric power to the electric motor according to a torque current command signal,
a shaft torque sensor configured to generate a shaft torque detection signal according to a shaft torque generated in the connecting shaft,
a rotational speed sensor configured to generate a rotational speed detection signal according to a rotational speed of the electric motor, and
a control device comprising:
a plurality of resonance suppression controllers configured to generate a torque electrical-current command signal such that mechanical resonance between the specimen and the electric motor is suppressed, and having respectively different input-output characteristics, when a higher-order command signal for the torque current command signal, and the shaft torque detection signal are inputted;
a specimen characteristic acquisition unit configured to acquire a value of a characteristic parameter of the specimen connected to the electric motor;
a resonance suppression controller selection unit configured to select one among the plurality of resonance suppression controllers based on the value of the characteristic parameter acquired by the specimen characteristic acquisition unit, and
an operation verification unit configured to verify an effect of the resonance suppression controller selected by the resonance suppression controller selection unit by comparing a first calculated transfer function when a function of the resonance suppression controller is turned off and a second calculated transfer function when the function is turned on,
wherein the control device inputs the higher-order command signal and the shaft torque detection signal to the resonance suppression controller selected by the resonance suppression controller selection unit, and inputs to the inverter the torque current command signal generated by the resonance suppression controller selected.

2. The testing system according to claim 1, wherein the characteristic parameter is an moment of inertia of the specimen connected to the electric motor.

3. The testing system according to claim 2, wherein the plurality of resonance suppression controllers are constructed under different set values for the moment of inertia and are associated with a numerical range that includes respective set value, and
the resonance suppression controller selection unit selects one among the plurality of resonance suppression controllers that includes the value of the moment of inertia acquired by the specimen characteristic acquisition unit in the numerical range.

4. The testing system according to claim 3, wherein the specimen characteristic acquisition unit includes:
a data acquisition unit configured to execute an excitation operation of the electric motor over a predetermined time according to a command manipulation from an operator, and acquire data including the shaft torque detection signal and the rotational speed detection signal during execution of the excitation operation; and
a characteristic parameter calculation unit configured to calculate a value of the characteristic parameter based on data acquired by the data acquisition unit.

5. The testing system according to claim 2, wherein the specimen characteristic acquisition unit includes:
a data acquisition unit configured to execute an excitation operation of the electric motor over a predetermined time according to a command manipulation from an operator, and acquire data including the shaft torque detection signal and the rotational speed detection signal during execution of the excitation operation; and
a characteristic parameter calculation unit configured to calculate a value of the characteristic parameter based on data acquired by the data acquisition unit.

6. The testing system according to claim 1, wherein the specimen characteristic acquisition unit includes:
a data acquisition unit configured to execute an excitation operation of the electric motor over a predetermined time according to a command manipulation from an operator, and acquire data including the shaft torque detection signal and the rotational speed detection signal during execution of the excitation operation; and a characteristic parameter calculation unit configured to calculate a value of the characteristic parameter based on data acquired by the data acquisition unit.

* * * * *